United States Patent
Garcia Morchon et al.

(10) Patent No.: US 10,068,506 B2
(45) Date of Patent: Sep. 4, 2018

(54) SYSTEM, DEVICE FOR CREATING AN AERIAL IMAGE

(71) Applicant: PHILIPS LIGHTING HOLDING B.V., Eindhoven (NL)

(72) Inventors: Oscar Garcia Morchon, Aachen (DE); Alan Pestrin, Eindhoven (NL); Kumar Arulandu, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 51 days.

(21) Appl. No.: 15/501,051

(22) PCT Filed: Jul. 1, 2015

(86) PCT No.: PCT/EP2015/065017
§ 371 (c)(1),
(2) Date: Feb. 1, 2017

(87) PCT Pub. No.: WO2016/015943
PCT Pub. Date: Feb. 4, 2016

(65) Prior Publication Data
US 2017/0221394 A1 Aug. 3, 2017

(30) Foreign Application Priority Data

Aug. 1, 2014 (EP) .................................... 14179470
Jan. 6, 2015 (EP) .................................... 15150202

(51) Int. Cl.
*G03B 21/14* (2006.01)
*H04N 13/39* (2018.01)
(Continued)

(52) U.S. Cl.
CPC .......... *G09F 19/18* (2013.01); *G03B 21/608* (2013.01); *G05D 1/0011* (2013.01);
(Continued)

(58) Field of Classification Search
CPC .......... G05D 1/00; G03B 21/14; G03B 21/00; G09F 19/18
See application file for complete search history.

(56) References Cited

U.S. PATENT DOCUMENTS 5,988,817 A * 11/1999 Mizushima ............. G09F 19/18
352/133
9,567,078 B2 * 2/2017 Zang .................... G05D 1/0038
(Continued)

FOREIGN PATENT DOCUMENTS

CN  201799120 U   4/2011
EP  0862082 A1    2/1998
(Continued)

OTHER PUBLICATIONS

Hortner, Horst et al., "Spaxels, Pixels in Space, A Novel Mode of Spatial Display," ARS Electronica Futurelab, Linz, Austria, Jun. 2014 (6 Pages).
(Continued)

*Primary Examiner* — William C Dowling

(57) ABSTRACT

The invention relates to a flying device (701) arranged to fly in a space and to present an image in that space, a system comprising multiple flying devices (701) for presenting an image in a space and a method for presenting an image in a space using a flying device (701), wherein the flying device (701) is arranged to fly in the space under control of a control signal, the flying device (701) comprising one or more light units (731) arranged to emit multiple light beams (711, 712, 713) a communication unit arranged to receive the control signal and a processing unit arranged to control, based on the received control signal a position of the flying device and a light output of each of the multiple beams (711, 712, 713).

14 Claims, 10 Drawing Sheets

(51) Int. Cl.
*G09F 19/18* (2006.01)
*G05D 1/10* (2006.01)
*H04N 13/04* (2006.01)
*G03B 21/608* (2014.01)
*G05D 1/00* (2006.01)

(52) U.S. Cl.
CPC ........... *G05D 1/0094* (2013.01); *G05D 1/104* (2013.01); *H04N 13/049* (2013.01); *H04N 13/39* (2018.05)

(56) References Cited

U.S. PATENT DOCUMENTS

| | | | |
|---|---|---|---|
| 2014/0233099 A1 | 8/2014 | Stark et al. | |
| 2016/0041628 A1* | 2/2016 | Verma | G06F 3/0304 345/156 |
| 2016/0284256 A1* | 9/2016 | Wigell | G09F 21/06 |
| 2016/0340006 A1* | 11/2016 | Tang | B63C 9/01 |
| 2017/0067734 A1* | 3/2017 | Heidemann | G01B 11/2513 |
| 2017/0137125 A1* | 5/2017 | Kales | B64C 39/024 |
| 2018/0047319 A1* | 2/2018 | Barba | G09F 21/06 |
| 2018/0090018 A1* | 3/2018 | Gavrilets | G08G 5/045 |

FOREIGN PATENT DOCUMENTS

| | | |
|---|---|---|
| EP | 2518580 A2 | 10/2012 |
| WO | 2013002778 A1 | 1/2013 |
| WO | 2013177059 A1 | 11/2013 |

OTHER PUBLICATIONS www.theblaze.com, "This Could Be the Largest Synchronized Quadrocopter Drone Swarm Ever," Last Visited on Jan. 31, 2017 (3 Pages).

\* cited by examiner

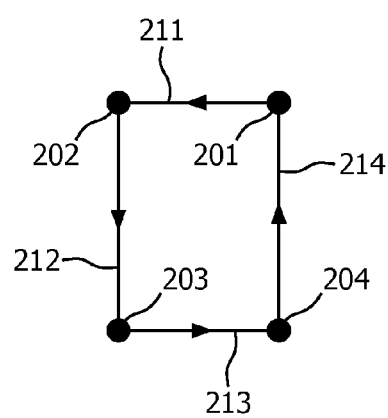
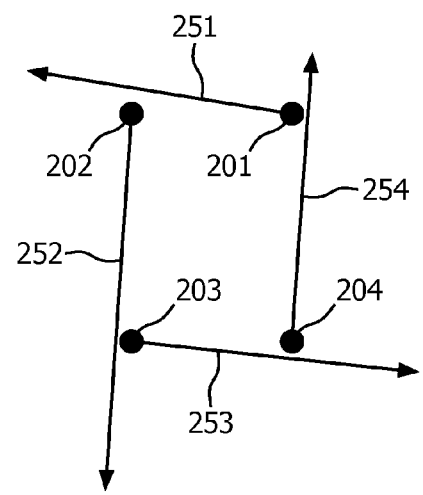
FIG. 2a          FIG. 2b
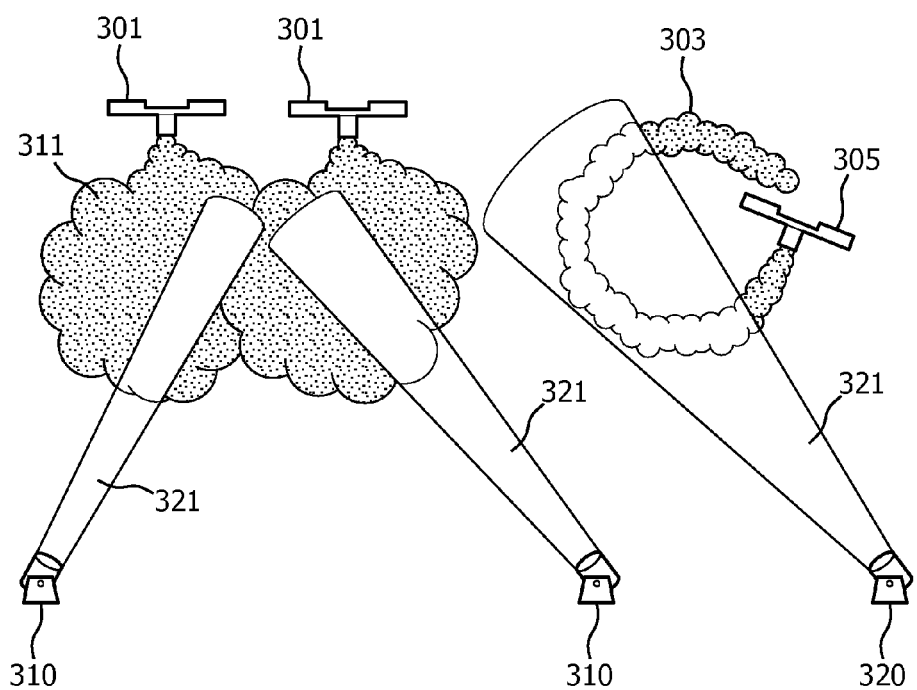
FIG. 3

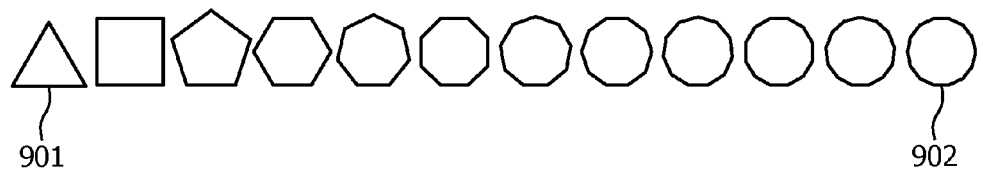
FIG. 9
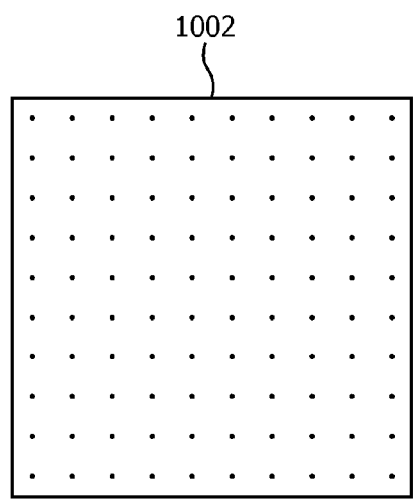 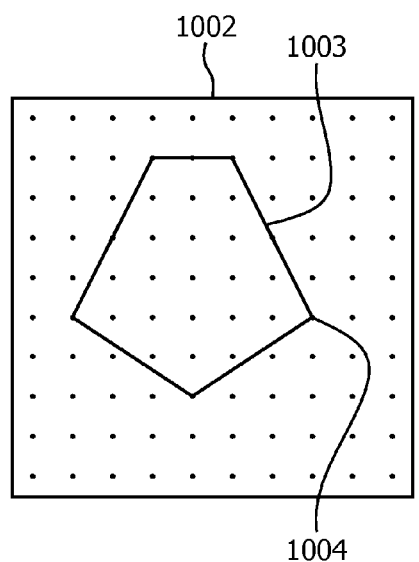
FIG. 10a      FIG. 10b

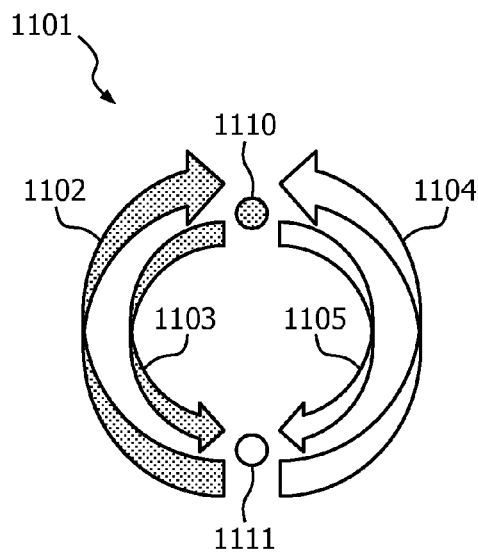
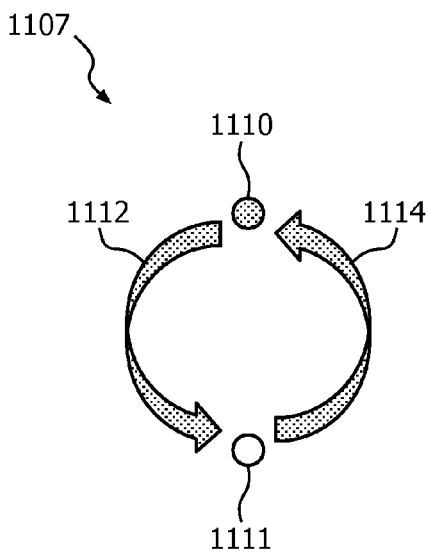
FIG. 11a  FIG. 11b
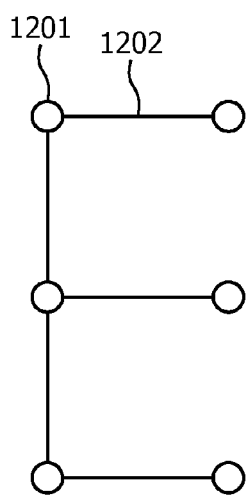
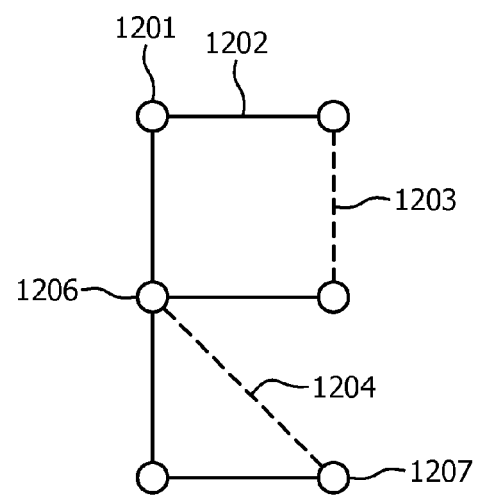
FIG. 12a  FIG. 12b

SYSTEM, DEVICE FOR CREATING AN AERIAL IMAGE

CROSS-REFERENCE TO PRIOR APPLICATIONS

This application is the U.S. National Phase application under 35 U.S.C. § 371 of International Application No. PCT/EP2015/065017, filed on Jul. 1, 2015, which claims the benefit of European Patent Application No. 14179470.1, filed on Aug. 1, 2014 and European Patent Application No. 15150202.8, filed on Jan. 1, 2015. These applications are hereby incorporated by reference herein.

FIELD OF THE INVENTION

The invention relates to flying devices for creating an aerial image in a space.

BACKGROUND OF THE INVENTION

Remote controlled flying devices are known for use in photographing or surveying operations from a position high up in the sky. In this manner it is possible to collect information to acquire such types of information, which cannot be obtained by photographing from ground surface or by surveying operation on the ground surface. US2014233099 discloses such a flying device, and further discloses an automatic take-off and landing system, having controllable light emitting elements for displaying patterns on a landing surface so as to assist in automatic take-off and landing procedures.

Other developments have aimed to use unmanned playing devices for creating aerial images in space. Literature publication Hörtner et al (2012), *Spaxels, Pixels in Space—A Novel Mode of Spatial Display*, (SIGMAP, page 19-24, SciTePress) describes a system using a swarm of unmanned aerial vehicles (UAVs) for creating a floating display in a three-dimensional space. Each UAV is equipped with a light source, so that it may be used as a flying pixel. The swarm of UAVs is centrally controlled by means of wireless communication between a control station and the respective drones. The positions of the respective UAVs are coordinated such that they collectively represent a three-dimensional (3D) sculpture of light nodes, wherein each UAV acts as a pixel/sample of the sculpture.

SUMMARY OF THE INVENTION

It is an object of the invention to provide an efficient means for creating an aerial image in a space.

In accordance with a first aspect of the invention a flying device is provided for presenting an image in a space, the flying device arranged to fly in the space, the flying device comprising: one or more light units arranged to emit multiple light beams in respective directions relative to the flying device, a communication unit arranged to receive a control signal, and a processing unit arranged to control, based on one or more received control signals a position of the flying device and a light output of each of the multiple light beams wherein the respective directions are along the axes of an orthogonal reference system, fixed relative to the flying device.

The flying device (hereinafter also referred to as 'drone') is arranged for flying in a space. For example, the drone may be a quad-copter for flying in an indoor space or an outdoor space. The drone has a light unit that is arranged for emitting multiple light beams in respective direction relative to the drone. For example, the light unit may have two light sources for emitting a first light beam horizontally and one for emitting a second beam vertically, when the drone is in operation.

The drone further comprises a communication unit for receiving a control signal. For example, the communication unit may be a wireless communication unit for receiving the control signal from an external computer, whereas the external computer may have a wireless RF communication unit for sending the control signal that comprises control data. Furthermore, the drone comprises a processing unit that controls, based on the control data, the position of the drone and/or the output of the light source. For example, the control data may include a desired position of the drone, and, in response to receiving said control data, the processing unit may control the drone and fly it to said desired position. The control data may also comprise an on/off status for each of the multiple light sources, causing the processing unit to switch each of the multiple light sources on/off according to said status.

The drone provides an efficient means for creating an aerial image in the space. The drone is capable of emitting multiple light beams in respective directions from any position in the space where the drone can fly. The (single) drone itself may therefore represent multiple line segments in the space. For example, the multiple line segments may be part of (an image comprising) a shape comprising line segments. Said shape may thus be efficiently represented using a limited number of drones. The single drone may represent multiple line segments, whereas the prior art (using each drone as a single flying pixel) requires multiple drones to represent a single line segment.

An additional advantage of using a limited number of the drones is a reduction of cost, as the total cost increases with the number of drones used. Another additional advantage of using a limited number of drones in the space is that a limited chance of collision between drones.

The aerial image in the space as generated by the flying device thus corresponds to an aerial display of light beams generated by the flying device. The aerial display of light beams of the flying device, or multiple devices, forms an aerial image in the space when perceived from the proper viewpoint. For the sake of brevity the term "aerial image" is also referred to as "image".

The respective directions are predetermined directions relative to the drone. For example, the flying device may comprise light sources mounted such that the light beams are directed in horizontal directions relative to the flying device. Consequently, the flying device would then generate horizontal light beams when the flying device is in operation, i.e. in flight.

The respective directions are along the axes of an orthogonal reference systems. For example, the flying device comprises light source that direct light beams along two respective orthogonal horizontal directions when in operation.

Optionally, at least one of the respective directions is parallel to gravity when the flying device is in operation. For example, one of the light sources on the flying device directs light beams downwards when in flight, thus parallel to the direction of gravitational force.

As example, a combination of the previous two options may provide a flying device being arranged to direct light beams in six respective directions corresponding to a +X, −X, +Y, −Y, +Z, and −Z axis of an orthogonal XYZ-reference system, wherein the Z-axis is aligned with the direction of gravitational force. In such a configuration, the flying device would provide an elementary building block of light beams for creating images comprising shapes having orthogonal line segments. For example, the flying device may be combined with similar flying devices in order to compose a three-dimensional shape of connected orthogonal line segments (e.g. making a letter "E" using five connected line segments').

It is noted that the flying device according to the invention is preferably used in a space or environment wherein there are sufficient particles; such as smoke or water droplets to reflect the light beams as provided by the flying device. In the event that there are insufficient particles, additional particles may be generated by means of smoke generators or fog machine. Optionally, the flying device further comprises a particle generator for generating particles for reflecting light. For example, the particle generator may be a smoke generator. By generating the particles, light of a light beam from the flying device (or from another, similar flying device) may be reflected, amplifying the visibility of that light beam.

According to a second aspect of the invention a system is provided for creating an image in a space, the system comprising multiple flying devices that jointly generate the image.

The system controls the drones collectively to represent said line segments of the image in the space. As mentioned before, a limited number of drones are required to (re)present the image. A single line segment may be represented by a single light beam, while multiple line segments may be represented by respective multiple light beams of a single drone. The system therefore requires a limited number of drones to represent the image.

The system preferably comprises a control unit arranged to determine the image to be presented in the space and wherein the image has line segments and each line segment of the line segments corresponds to a position and an orientation in the space, to associate to the each line segment a flying device of the multiple flying devices for representing the respective line segments in the space, and wherein at least one of the multiple flying devices is arranged to represent at least two of the line segments, and to determine for the each flying device a control signal for controlling a position and a light output of the each flying device such that the each line segment is being presented in the space by a light beam of the associated flying device, and the system further comprises a communication unit for sending the respective command signal to the flying devices.

Optionally, the system is arranged for representing an image having a first line segment represented by a first flying device and a second line segment represented by a second flying device, the first line segment being connected in the space to the second line segment. The system may thus be used to represent an image having connected line segments. For example, the image comprises polyhedron-shape having flying devices positioned at nodes/corners of the shape and wherein edges are represented by light beams of the flying devices.

BRIEF DESCRIPTION OF THE DRAWINGS

This and other aspects of the present invention will now be described in more detail, with reference to the appended drawings wherein like and/or corresponding elements are referred to by like reference numbers.

FIG. 2a illustrates nodes representing drones at positions corresponding to corners of the rectangle, FIG. 2b illustrates a situation wherein the drones emit laser beams are missing their respective neighboring drones, FIG. 3 illustrates an example of creating an image using drones, FIG. 9 illustrates piece-wise approximation of a shape being a circle, FIG. 10a illustrates a grid-of-points without a shape, FIG. 10b illustrates a grid-of-points and a pentagon-like shape having five nodes and five line segments, FIGS. 11a and 11b illustrate two flight paths of two respective drones for 'writing' the letter "O", FIGS. 12a and 12b illustrate a letter "E" being transformed into a graph wherein each vertex has an even number of line segments.

DETAILED DESCRIPTION OF THE DRAWINGS

Figure 1:
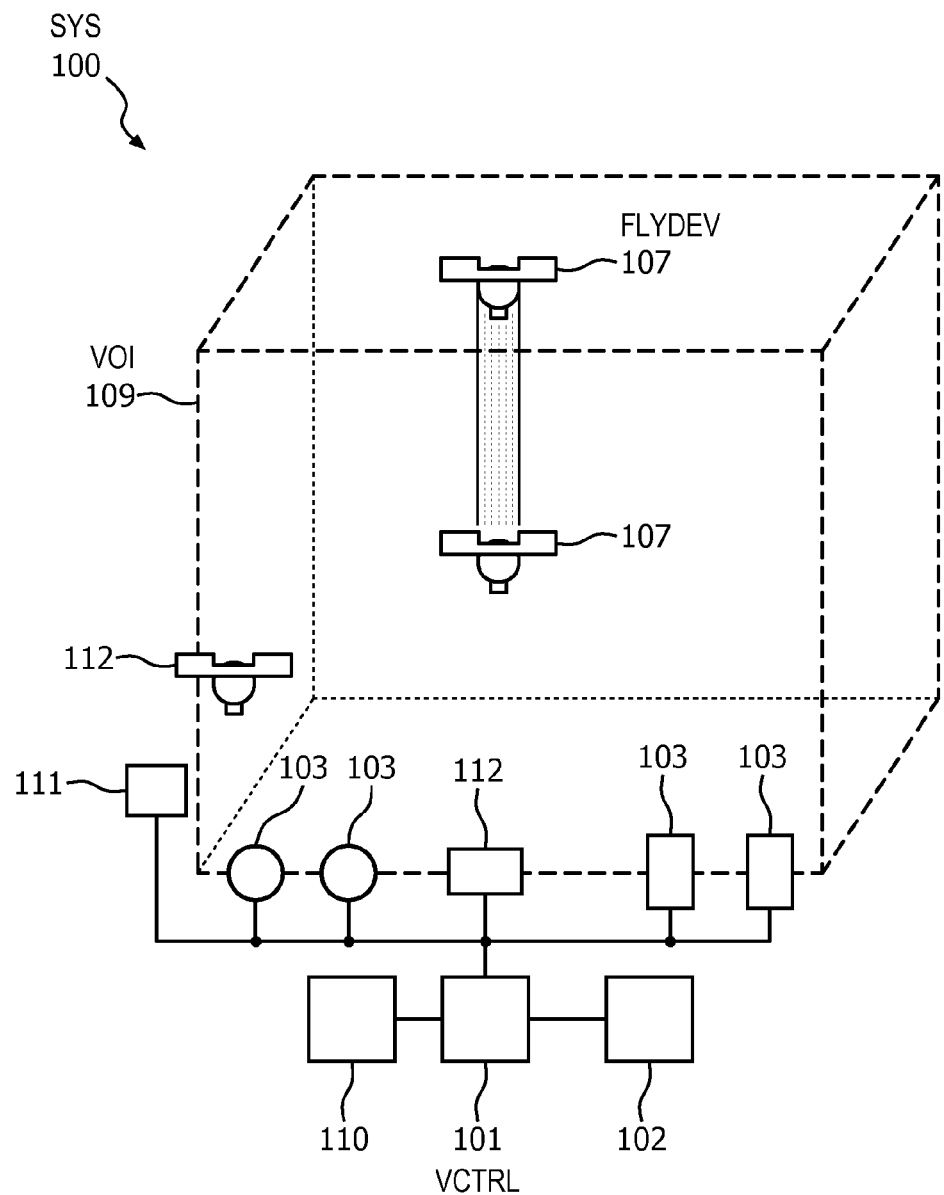
FIG. 1 illustrates an overall system.

FIG. 1 illustrates an overall system SYS 100. The system comprises multiple flying devices 107 FLYDEV, hereinafter also referred to as 'drones'. The drones FLYDEV are capable of flying in a space being a volume of interest VOI 109. The volume of interest VOI may be further surrounded by an additional volume of protection (not shown in FIG. 1) for allowing the drones FLYDEV to enter or leave the volume of interest VOI to/from a starting point, respectively.

A drone FLYDEV has a processor, a communication unit, a physical means for flying, an engine, and a fuel element. For example, the physical means for flying may comprise chopper blades for providing lift to the drone. The processor is connected to the engine and is arranged to control a position of the drone FLYDEV by sending an appropriate command to the engine. The processor is connected to the communication unit so as to receive a control signal via the communication unit. Based on the control signal, the processor may control the position of the drone FLYDEV.

An example of the drone FLYDEV may be as follows. The drone FLYDEV may be a quad-copter (i.e. unmanned multi-rotor helicopter) capable of hovering at a position in the space. The engine may be an electrically driven engine or a combustion engine. The fuel element may be a fixed battery (e.g. lithium) for providing an electrical current to the electrically driven engine, or a petrol tank for providing petrol to the combustion engine, respectively. The processor may be any processor suitable for controlling an electronic device such as a drone. The communication unit is preferably arranged for wireless communication so as to receive the control signal wirelessly, but may also be arranged for receiving a control signal via a wired connection, e.g. prior to a flight of the drone. The communication unit may be further arranged for wirelessly sending data, for example a status message.

The drones FLYDEV may be equipped with a light unit that comprises a light source capable of emitting visible light. In FIG. 1, an upper drone of the drones FLYDEV is arranged to emit a light beam downwards towards a lower drone. Conversely, the lower drone may (also) be arranged to emit a light beam upwards towards the upper drone. A drone FLYDEV is thus capable of representing a line segment in the volume of interest by means of a 'flying' light beam.

The drone FLYDEV is typically equipped with a communication unit for receiving a control signal for controlling a position of the drone FLYDEV and/or controlling its light unit. The control signal comprises control data which, in turn, may comprise a next position for the drone FLYDEV, for example. In response to receiving the control signal, the drone FLYDEV may then extract said next position from the control data, and fly to said next position. As another example, the control data may also comprise a flight path consisting of several positions: in response to receiving the flight path, the drone FLYDEV extracts said flight path and flies along each of the several positions successively until reaching the final one of the several positions. The control data may also comprise lighting parameters for controlling the light unit. For example, said control data may comprise lighting parameters such as a light intensity: in response to receiving said control data, the drone FLYDEV may set the intensity of said light source to said light intensity. The control data may further comprise timing data, defining when the drone should be at a position in the space and when the light source should be switch on or off.

The communication unit requires at least receiving a control signal, but may also be arranged for sending a status message, for example regarding a battery level.

The system SYS may be centrally controlled by a control unit 101 VCTRL. The control unit VCTRL may in turn be connected to a user interface 102 for enabling a user to control the drones FLYDEV. The control unit 101 VCTRL may be further connected to a source of information, such as a memory card or an internet connection to a remote content server 110, in order to retrieve an image to be represented in the space. From the retrieved image, the control unit 101 VCTRL may determine control data for controlling the drones, so that the drones represent the image by means of emitted light from their respective light sources. The control unit 101 VCTRL may have a communication unit to transmit the control signal comprising the control data, in order to be received by the drones FLYDEV. According to the received control data, the drones FLYDEV may then fly to the respective positions and control their respective light units accordingly. The control unit 101 VCTRL further has a memory and a processor for executing instructions, e.g. for performing said control of the drones FLYDEV.

More specifically, the control data may comprise positions of the respective drones FLYDEV and an on-off status for each respective light source. Consequently, the drones FLYDEV provide emitted light at a respective position in the space at a respective moment in time, according to the image to be represented. For example, the image may comprise a shape having line segments, wherein each of the line segments is to be represented by a light beam of a respective drone FLYDEV. The control unit 101 VCTRL may determine the control data unit based an image to be represented. Alternatively, software running on an external computer may be used to determine the control data based on said image, whereas the determined control data may then be provided to the control unit, for example via a memory card. The resulting 'flying' image may be used for the purpose of entertainment or advertisement, for example. The image may be created by a user using a content creation tool (not shown in FIG. 1), for example a software program on a computer.

The system SYS may further comprise a particle generator for generating a cloud of (fine) particles in order to enhance visibility of emitted light inside the volume of interest VOI. For example, the particle generator may generate smoke or water vapor. Consequently, emitted light in the volume of interest will be amplified by reflecting off the fine particles in said cloud. The particle generator needs to be placed in or near the volume of interest VOI. In addition (or instead), a drone FLYDEV may be equipped with a particle generator in order to generate particles at a desired position in the three-dimensional (3D) space of the volume of interest. Benefits of generating the particle cloud via a drone include that the particles may be released at any point in the 3D space and also that the particle generator is easily placed (i.e. by flying) at the desired position. The system SYS may comprise a mixture of drones FLYDEV, wherein some drones have only a light unit, some drones have only a particle generator and some drones have both a light unit and a particle generator.

The system may further comprise additional devices, such as light sources (e.g. on the ground), light reflectors, speakers, and smoke generators located in or near the volume of interest VOI. The control unit 101 VCTRL may control said additional devices.

The system may also comprise a maintenance unit 111 near the volume of interest VOI to perform automatic maintenance of flying units, such as the replacement or recharge of its battery or smoke liquid. For example, such maintenance may be coordinated by the control unit 101 as follows The control unit 101 VCTRL receives a status message from each drone FLYDEV at regular intervals regarding the remaining battery level. Consequently, the control unit 101 VCTRL keeps track of the battery level in each drone FLYDEV so a drone having a low battery level is replaced by another drone 112 having a fully charged battery. Meanwhile, the control unit 101 VCTRL directs the drone having a low battery level to the maintenance, so that its battery can be replaced or recharged.

The control unit 101 VCTRL may collect information from a variety of sensors 103, e.g. regarding wind speed, wind direction, rain detector, temperature, radar, or camera. Information from the sensors 103 may be used by the control unit 101 VCTRL for various purposes. The wind speed and wind direction may be used to improve the stability of the drones FLYDEV. For example, said information from the sensors 103 may be sent to the drones FLYDEV, so that the drones FLYDEV may stabilize their hovering positions by flying against the wind direction using an appropriate counter force. In addition, if emitted light is being amplified by means of generating a particle cloud (e.g. smoke, steam) in or near the volume of interest VOI, then wind information may be used to deploy smoke particles at an appropriate location such that wind is compensated for. A rain detector detecting the amount of humidity in the environment may be used by the control unit 101 VCTRL to generate an alarm that the drones FLYDEV or the control unit may be damaged. Likewise, a temperature sensor may be used to trigger an alarm when the external temperature is out of the operational range of the drones FLYDEV. For instance, if the humidity level is moderate and the temperature is under zero, then there may be a risk of ice formation on the flying devices that could lead to an accident. The temperature sensor may also be used to determine visibility of the particles cloud so that the amount and features of particles can be adjusted accordingly (e.g. steam is more visible in low temperatures than in high temperatures). The radar and camera sensors are located near the volume of interest VOI and may be arranged to detect whether other objects enter the volume of interest VOI. Such an object may be another drone (not belonging to the system) flying into the volume of interest VOI or a person walking into the volume of interest VOI. The radar and camera may be used to determine whether a drone FLYDEV unintentionally leaves the volume of interest VOI. In addition, a camera and radar may be used to determine an actual position of a drone FLYDEV and to determine whether the drone FLYDEV is at its intended position. A difference between the intended position and the actual position may be used by the control unit CTRLU to correct said actual position and maintain said drone at its intended position.

The drones FLYDEV may be a type of helicopter or a fixed wing aerial vehicle. The drones FLYDEV are preferably unmanned aerial vehicles (UAVs).

A first example for the drone FLYDEV concerns a single-axis helicopter. An advantage of helicopters is an ability to maneuver and hover. A potential disadvantage of helicopters is a high rotational speed of its propellers, so that a collision may cause damage in case the propellers make contact with another object during flight. A second example may be a multi-rotor helicopter. Additional advantages of multi-rotors are stability, a redundancy to motor failures and robustness. A potential disadvantage is noise due to the multiple rotors. A third example is a fixed-wing aerial vehicle having wings to provide lift. An advantage of fixed-wing aerial vehicles may be speed, in case speed is of use in the particular application. A potential disadvantage of the latter devices is the lack of ability to hover and to maneuver. In the case that hovering at a position is mandatory for creating an aerial image, a fixed wing aerial vehicle is not suitable. In summary, for creating an image using the system SYS, a flying vehicle capable of hovering is preferred, thus a single-axis helicopter or a multi-rotor helicopter.

Control of the drones FLYDEV may be according to distributed, centralized or mixed control. A first example of the control concerns distributed control. Each drone FLYDEV may communicate with others and there is no master-slave communication protocol. This means that there is no central node to keep track of the drones FLYDEV and manage them. Each drone FLYDEV may be arranged for autonomous control after receiving control data for controlling the drone's position and optionally for controlling a light unit or a particle generator. In addition, a drone FLYDEV may be arranged to communicate with other drones FLYDEV in order to coordinate their respective positions and, optionally, control of a respective light unit or particle generator. An advantage may be the redundancy to node failures because there is no central node that may fail due to, for example, a hardware failure. A disadvantage may be that distributed control is relatively complicated to implement as each drone is required to perform its own computations for autonomous control and to communicate with other drones to coordinate its movements with said other drones. This variant is not further elaborated here.

A second example of the control concerns centralized control. A control station is arranged for managing the entire system SYS. The control station may comprise the control unit 101 VCTRL. The control station operates as a master to the drones FLYDEV being the 'slaves'. For example, the control station may be required to continuously send control data comprising positional corrections to a drone FLYDEV in order maintain that drone hovering in a static position. Advantage of the centralized control is the simplicity of a system infrastructure: control data is processed in the control station, and consequently control data may be sent to the drones FLYDEV. A disadvantage may be that a failure of the central node may cause a failure of the entire system SYS.

A third example of the control concerns mixed control. A control station is arranged for management of the entire system SYS. It communicates by sending each of the drones FLYDEV control data and may also receive a status message from each drone FLYDEV. For example, the control station may send the control data comprising a next position in the space to a drone FLYDEV. The drone FLYDEV may then receive the control data, extract said next position from the control data, autonomously plan a flight path from its current position to said next position and fly to said next position along the planned flight path. Note that this would require the drone FLYDEV to have a means to determine its own position and orientation. In case a drone FLYDEV receives no control data from the control station, its processing unit may be programmed so as to keep the drone hovering at its current position in the space. Such a drone FLYDEV is thus autonomous to a limited extent. Mixed control therefore combines advantages from centralized control and distributed control: simplicity of the system infrastructure and robustness of the system to a failure in the control station.

The drone FLYDEV may comprise a light unit, wherein the light unit has a light source arranged for emitting a laser beam laser light or a light beam of 'normal' visible light. Laser light refers to light having a narrow spectrum and a high spatial coherence. 'Normal' visible light refers to light having a low spatial coherence as compared to laser light, for example visible white light or visible colored light. A light beam of visible light refers to a collimated bundle of light, such as generated by a spotlight or a stage light. An effect of the light beam in the space is a straight line segment of light. In what follows, light or visible light refers to said 'normal' visible light unless specified otherwise.

The light unit may comprise a laser pointer capable of emitting a laser beam. The laser beam can be pointed to different directions and thus create a straight line in the air. An advantage of using a laser pointer system is a good visibility of the straight line. A potential disadvantage of using the laser beam is that the laser beam continues until it hits a target. This may pose a problem when using the drones FLYDEV that have laser pointers for representing a shape having line segments of limited length, because such line segments become misrepresented by the continuing laser beams. The problem may be resolved by blocking the continuing laser from a drone FLYDEV by another drone FLYDEV.

Resolving said problem is further illustrated by FIGS. 2a and 2b. FIGS. 2a and 2b illustrate creating a rectangle shape in the air wherein visual content with a laser beam is respectively hitting or missing a target. In FIG. 2a, nodes 201-204 represent drones at positions corresponding to corners of the rectangle, whereas edges 211-214 represent respective laser beams emitted by the respective drones 201-204. Note that, in FIG. 2a, the edges 211-214 effectively become connected at the respective nodes 201-204. Each drone 201-204 directs a light beam towards a drone 201-204 at a neighboring corner of the rectangle. For example, drone 201 is positioned (hovers) at the top right corner of the rectangle and directs a laser beam 211 at another drone 202 at the top left corner of the rectangle. The drone 202 therefore blocks the laser beam 211. In a similar manner, laser beams 212, 213 and 214 are blocked by drones 203, 204, and 201, respectively. As a consequence, in FIG. 2a, the drones 201-204 collectively represent the rectangle having edges being line segments that have a limited edge. However, FIG. 2b illustrates a situation wherein the drones 201, 202, 203 and 204 emit laser beams 251-254 are missing their respective neighboring drones 202, 203, 204 and 201. Consequently, the laser beams do not get blocked and the rectangle becomes misrepresented. FIGS. 2a and 2b thus illustrate a requirement that the laser beams 211-214, 251-254 from drones 201-204 are to be directed accurately at their neighboring drones and/or that positions of the neighboring drones are to be coordinated accurately, for otherwise the shape having line segments of limited lengths (i.e. the rectangle) are not properly represented by said laser beams. In practice, using laser beams to represent an image having line segments may therefore be error-prone.

A more practical and more preferable example may therefore be provided by the light units having light sources arranged for emitting light beams of 'normal' visible light (as described above). As in FIGS. 2a and 2b, the rectangle may also be represented by drones 201-204 emitting light beams of (non-laser) visible light. An advantage of using such light beams is that the light beams do not need to be blocked by a target, e.g. another drone 201-204. For example, a light beam of white light is spatially incoherent and therefore does not continue along a straight line as the laser beam. As a consequence, the aforementioned requirement to direct the light beams accurately toward a neighboring drone in order to get blocked does not apply to 'normal' visible light. Although such a light beam may be less visible than a laser beam, it typically has a limited length in the space. Accurately blocking a light beam from a drone by another drone does therefore not pose a problem as compared to using a laser beam.

As mentioned above, the drone FLYDEV may further comprise a particle generator. The particle generator may be a smoke generator, for example. A drone FLYDEV may have both a light source and a particle generator. The particle generator may be used to enhance the visibility of the light emitted by the drone's light source. However, when in flight, the drone FLYDEV being a multi-rotor helicopter creates a downward airstream, so that the visibility of the light beam is enhanced most when the light beam is also directed downwards from the drone.

As mentioned before, the system SYS may comprise a mixture of drones FLYDEV, wherein some drones FLYDEV may have only a light unit, some drones may have only a particle generator and some drones may have both a light unit and a particle generator. Therefore, a drone FLYDEV having a particle generator may be used to enhance the visibility of a light beam from another drone FLYDEV, rather than to enhance the visibility of its own light beam. Drones FLYDEV having a particle generator may create a particle cloud, whereas drones FLYDEV having a light unit may emit a light beam in the particle cloud. Such a mixture of drones may have an advantage in that a drone does not need to carry both a light unit and a particle generator, thus saving weight and energy.

The drone FLYDEV may comprise a GPS receiver to determine its position via GPS. Advantage of the drone having a GPS receiver that no additional equipment needs to be set-up for determining a position of the drone FLYDEV, as the drone FLYDEV is capable of determining its own position. A disadvantage of this system may be a potentially low spatial accuracy. A spatial accuracy of GPS positioning may be around a few meters.

Alternatively, the position of the drone FLYDEV may be tracked by a fixed tracking system placed near or in the volume of interest VOI. A common method is to place markers on the drones FLYDEV and track the drones using cameras that are placed within the volume of interest VOI. Such a tracking system is described in the following literature: (a) Michael, N., Mellinger, D., Lindsey, Q., & Kumar, V. (2010). The GRASP Multiple Micro UAV Testbed. Robotics & Automation Magazine, IEEE, 17(3), 56-65, (b) Mellinger, D., Shomin, M., & Kumar, V. (2010). Control of Quadrotors for Robust Perching and Landing. Proceedings of the International Powered Lift Conference, and (c) Lupashin, S., Schollig, A., Sherback, M., & D'Andrea, R. (2010). A Simple Learning Strategy for High-Speed Quadrocopter Multi-Flips. Robotics and Automation (ICRA), 2010 IEEE International Conference on. IEEE). An advantage of the fixed tracking system is a high spatial accuracy which may be in order of a few. A drawback of a fixed tracking system is the need for setting up the fixed tracking system in the volume of interest. For example, setting up the fixed tracking system includes calibrating positions of the cameras.

The system SYS may create a static image in the space, as described above. The static image may be created by the drones FLYDEV hovering at respective static positions while the drones FLYDEV emit visible light. A drone FLYDEV having a light unit comprising a LED may act as a dynamic pixel in the space. A drone having a light unit for creating a beam of visible light may represent a line segment in the space. An advantage of creating a static image may be that the drones FLYDEV are not moving, so that the risk of a collision is low, provided that the drones are not flying too near each other.

Alternatively, the system SYS may create a dynamic image in the space. The dynamic image may be created by the drones FLYDEV flying along a predetermined path while emitting light. For example, the multiple drones FLYDEV may fly successively along a circular path while emitting light, thus 'writing' the character 'O'. Creating a dynamic image in such a way is scalable, as a single drone FLYDEV may be used for this purpose, but also multiple drones FLYDEV flying along the same path. When multiple drones FLYDEV are flying in the same space the system SYS is required to carefully coordinate positions and movements of the respective multiple drones so as to avoid collisions. Each drone may receive a flight path and a corresponding timing to traverse the flight path from the controls unit (control station).

In view of the above, a preferred example may comprise a drone FLYDEV being a multi-rotor helicopter, the control being mixed, the created image being either static or dynamic, and the drone having (a) a light unit comprising a light source, (b) optionally a smoke generator, and (c) a GPS receiver for determining its own position.

The following phases may be identified in operating the system SYS: a content creation phase, an initialization phase, and an execution phase.

In the content creation phase, visual content is created. For example, the visual content may include a word, a drawing, a logo, or an animation. Visual content creation may be performed by a user using a computer program running on a PC. The computer program may be used for creating (geometrical) shapes composed of graphical elements that can be represented by drones and their respective light units. For example, the graphical elements may include a dot or a line segment. A drone having a light source (e.g. an LED) emitting omnidirectional visible light in the form of a light node may represent a dot. A drone having a light source emitting visible light in the form of a light beam may represent a line segment. An aerial image is thus created by the respective drones representing dots and line segments of the (geometrical) shape in the volume of interest VOI. As another example, the graphical elements may include curved line segments of a 'written' character, such as the letters 'o' or 'e'. As mentioned also above, the drone having a light source emitting visible light in the form of a light node may represent the curved line segment by flying along a flying path in the form of the curved line segment while emitting light. The aerial image may be then created by multiple drones successively flying along said path while emitting light. The computer program may enable a user to transform existing visual content into shapes composed of dots and/or line segments, or it may enable user to design such shapes from scratch.

In the initialization phase, the system SYS is being initialized for creating the 'flying' image in the volume of interest VOI. A computer program for initializing may generate a configuration file comprising flying paths, corresponding timing and light control data for the respective drones based on the shapes created in the content creation phase. The configuration file thus comprises data required to control the drones FLYDEV in order to create the 'flying' image in the volume of interest VOI. For example, the configuration file comprises a required position of each drone FLYDEV at a given moment, a flying path for each drone to get to its required position, an associated status of its light source (e.g. on/off) at a given moment. As a result, each drone FLYDEV is at its required position at a given time and represents a respective graphical element (e.g. dot, line segment) as part of a shape, so that the drones FLYDEV collectively represent the shape at said given time. The configuration file may further include the orientation of each drone at a given time. The computer program may coordinate the design of flight paths of respective drones such that collisions are avoided. The computer program may run on an external computer, the configuration file may then be subsequently uploaded to the control unit 101 VCTRL, so as to be stored in the memory of the control unit 101 VCTRL. Alternatively, the computer program runs on the processor of the control unit 101 VCTRL itself. Finally, the control unit may extract, from the configuration file, the respective control data for each drone FLYDEV and upload the respective control data to each drone. Finally, the control unit 101 VCTRL may perform pre-flight hardware checks, for example to verify communication with each drone, to verify the battery level of each drone. Each drone may then be positioned at a position for taking off, as specified by the configuration file.

In the execution phase, creation of the 'flying' image is being executed. Each drone FLYDEV executes steps according to its control data: controlling its position and light source as specified by the control data. According to the aforementioned mixed control, each drone executes said steps with certain extent of autonomy. The control unit 101 VCTRL may monitor each drone and verify correct execution of creating the image. For example, each drone may send its current position at regular time intervals to the control unit 101 VCTRL. Furthermore, the control unit 101 VCTRL may monitor other parameters of each drone, such a battery level of the drone for example. The control unit may also monitor whether an emergency situation occurs. For example, an emergency situation may occur when a drone sends a status message regarding a critical hardware failure of the drone. Or, as another example, an emergency may occur when the control unit senses, via a wind speed sensor an excessive wind speed. In case of such an emergency situation, the control unit may respond by sending respective message to the drones that causes the drones to land.

FIG. 3 illustrates an example of creating an image using drones. Drones 301 each comprise a particle generator and together generate a particle cloud 311. Ground-based pitch light units 310 emit light beams 321 which reflect of the particle cloud 311. The particle cloud 311 thus enhances visibility of the light beams 321. The light beams 321 may thus create line segments of light or dots of light on the particle cloud 311. The light units 310 may have a motor to direct its light beam 321 in various directions, a communication unit to receive control data from the control unit CTRL, and may be arranged to control its emitted light and a direction of its light beam 321 based on the control data. The control data may comprise a direction of the light beam 321 and an on/off status or intensity of the light beam 321.

Alternatively, the ground-based light units 310 may be laser pointers arranged to emit laser beams.

FIG. 3 further shows a drone 305 having a particle generator for generating particles. The drone 305 flies a circular path and consequently generates a circular particle cloud 303. During flight, the drone 305 is not being in a level flight, but rather makes a 'looping'. The visibility of the particle cloud 303 is enhanced by a light beam 321 which is generated by a light unit 320. Because the particles are directed in the same direction as the light beam (i.e. downwards relative to the drone), the light beam directly reflects off particles that are just released by the particle generator, and said visibility of the light beam is therefore enhanced greatly.

Figure 4:
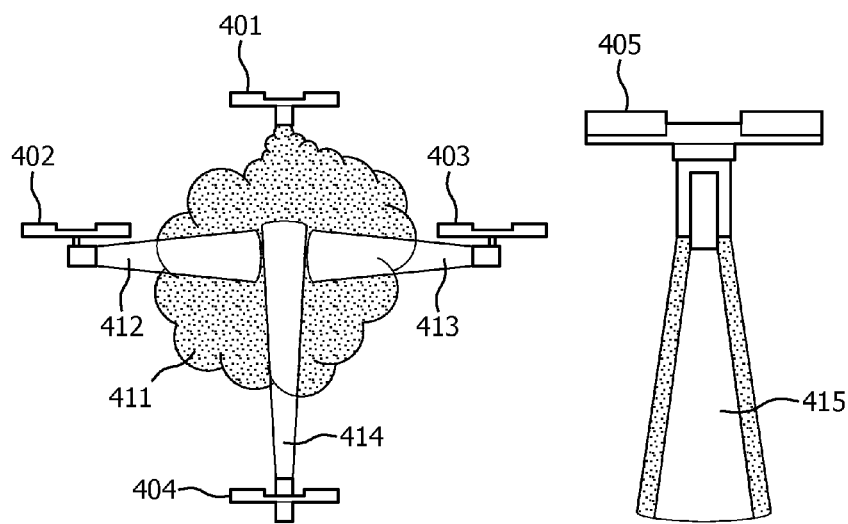
FIG. 4 illustrates another example of creating an image using drones.

FIG. 4 illustrates another example of creating an image using drones. A drone 401 has a particle generator to create a particle cloud 411. A drone 402 has a light source for generating a light beam 412. The light beam 412 is directed horizontally into the particle cloud 411. The drones 402 may have a motor to tilt its light source and consequently tilt the respective light beams 412. The light beam 412 may be rotated to any azimuth in a horizontal plane by rotating the drone 402 around its vertical axis. By tilting the light source 402 the light beam 412 may be tilted between a downward direction and a horizontal direction. The control unit 101 VCTRL may send a control signal to the drone 403. The control signal may comprise control data for controlling the orientation (azimuth) and position of the drone 402, as well as a tilt angle of the light source. Alternatively, the drone 402 may have a light source with a fixed tilt angle (e.g. fixed at a horizontal direction).

FIG. 4 further shows drones 403, 404 and 405. Drone 403 also directs a light beam 413 horizontally into the particle cloud 411. Drone 403 may be similar to drone 402. Drone 404 has a light source that directs a light beam 414 upward into or onto the particle cloud.

FIG. 4 thus shows drones arranged to direct a light beam in (at least a) downward, upward or horizontal direction. The light beams 412-414 may each represent a line segment. Collectively, the light beams 412-414 represent a T-like shape composed of three line segments. Note that FIG. 4 shows drones in two different roles: drone 401 has a role of generating a particle cloud, whereas drones 402-404 generate light.

FIG. 4 further shows a drone 405 (comprising a light unit) having a light source for emitting a light beam 415 in a downward direction. Drone 405 may also comprise a particle generator to generate particles in the downward direction. This way, a generated particle cloud is formed in the same direction as the light beam 415. In addition, rotors of the drone 405 create downward airflow so that the particle cloud is spread out along the light beam 415. As a result, visibility of the light beam 415 is enhanced in an optimal way. The particle generator and the light unit may be connected or synchronized, such that the particle generator generates smoke when the light source emits light. Alternatively, the light source and the particle generator are to be activated separately, but the control unit 101 VCTRL may send control data (to the drone 405) specifying that the light source emits light and the particle generator generates particles at the same time.

In a variant of the previous example, the drone 405 may have a light source and a particle generator for generating light and particles respectively in other another direction than the downward direction. For example, the drone 405 has a light source for emitting a light beam in a horizontal direction and has a particle generator for generating particles in the same horizontal direction. To minimize the impact of a downward airflow from the rotors, the particle generator needs to release its particles away from the rotors. The particle generator therefore has an outlet placed away from the rotors.

Figure 5:
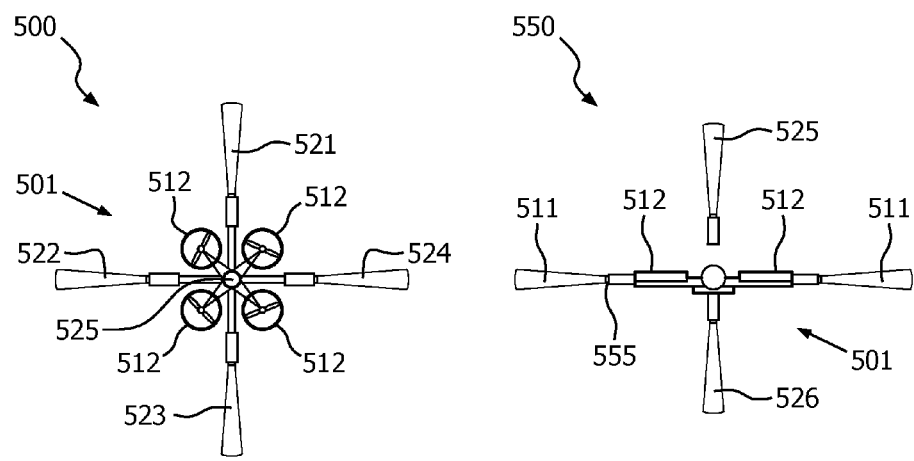
FIG. 5 shows an example of a drone having a light unit having six light sources for emitting respective six different light beams.

FIG. 5 shows an example of a drone 501 having a light unit having six light sources for emitting respective six different light beams 521-526. Subfigure 500 shows a top view of the drone 501, whereas subfigure 550 shows a side view of the drone 501. The light beams 521-526 are directed along three axes (X, Y, and Z) of an orthogonal reference frame. In the particular example of FIG. 5, the Z-axis is parallel with the direction of gravity.

Each of the light sources 521-526 may further be combined with a particle generator, as described above. The particle generator may be configured such that its outlet is near the point where the emitted light beam originates from the light source. For example, a particle generator combined with a light source that emits the light beam 511 may have an outlet near the point 555. In order to minimize impact of the downward airflow on particles from the non-downward directed particles generators (i.e. combined with light beams 521-525), each outlet may be at a sufficiently large distance from the rotors 512. The rotors 512 may therefore at a sufficiently large distance from the center of the drone, where light sources 525 and 525 are. Also, the light sources 521-254 may therefore be at a sufficiently large distance from the rotors, thus even farther from the center of the drone.

In variant of the previous example, the drone 501 does not have the upward directed particle generator, as the upward directed particles are most sensitive to the downward airflow. In another variant, the drone 501 comprises three light sources: the two light sources for emitting a horizontally directed light beam (e.g. 522 and 524) and the light source for emitting the downward directed light beam 526. By having the light beams from the three light sources in the same vertical plane (i.e. light beams 522, 524 and 526), the drone 501 may be used for creating an image having a shape composed of line segments in the vertical plane. In addition, the drone 501 may have the light source for directing the light beam 525 (i.e. in an upward direction) but without the particle generator.

Figure 6:
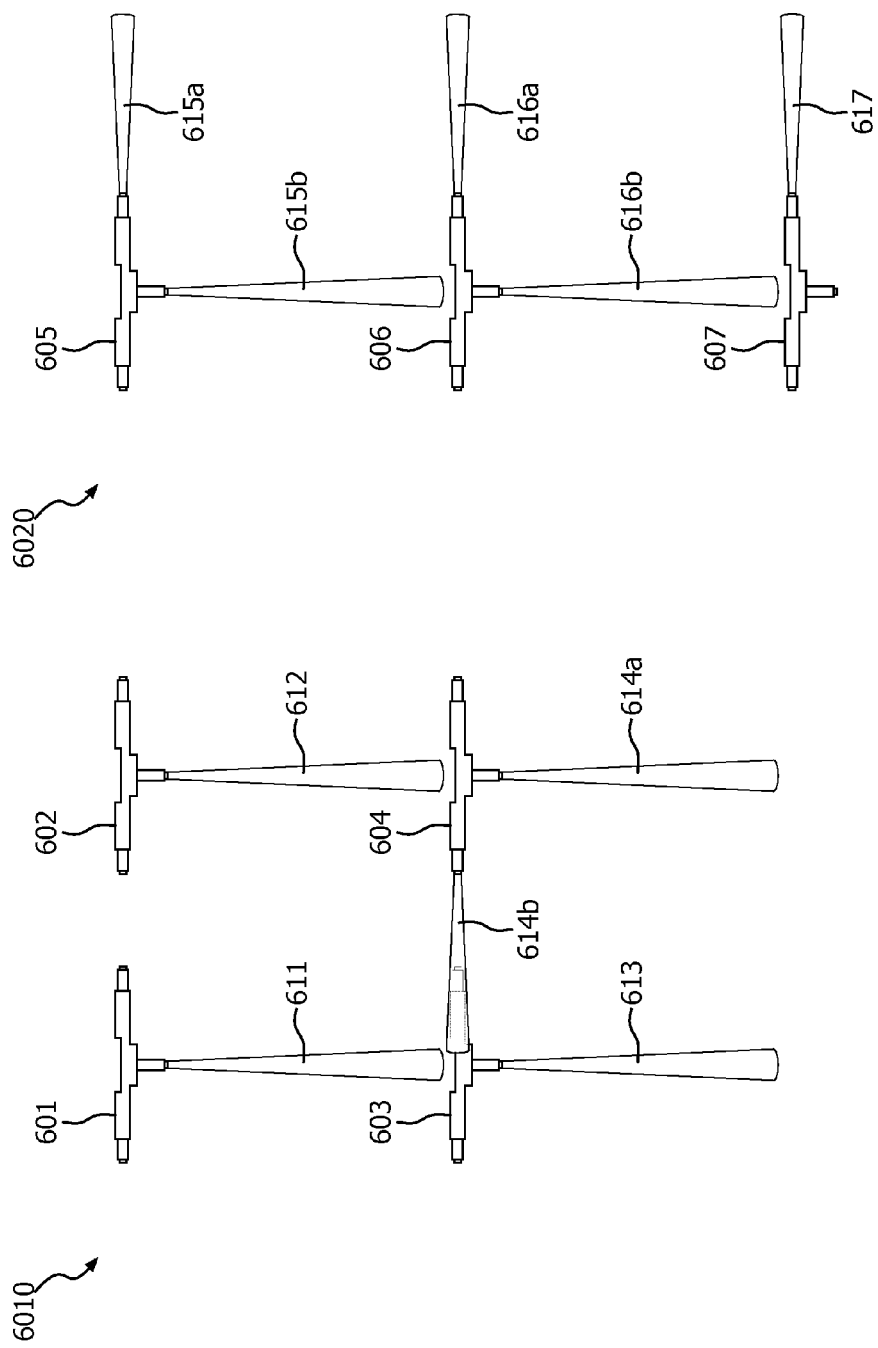
FIG. 6 illustrates an image comprising characters created using drones according to the previous examples.

FIG. 6 illustrates an image comprising characters created using drones according to the previous examples. Subgraph 6010 illustrates a letter "H" composed of 5 line segments represented by 5 light beams 611-613, 614a and 614b, respectively. The light beams 611, 612, 613 and 614a are all directed downwards and generated by light sources of drones 601-604, respectively. The drone 604 also generates the horizontally directed light beam 614b, in addition to the vertically directed light beam 614a. In subgraph 6010, each of the drones 601-604 may have three light sources according to an example above, yet only use one or two of its light sources to emit light and collectively create the letter "H".

In a similar way, subgraph 6020 of FIG. 6 illustrates a letter "E", also composed of 5 line segments represented by 5 light beams 615a, 615b, 616a, 616b and 617, respectively. In this case, only three drones 605-607 are needed to create an image of the letter "E", because the drones 605 and 606 each emit two light beams (i.e. four light beams in total). Each drone 605-607 generates a horizontal light beam 615a, 616a and 617, respectively. In addition, the drone 605 also creates the vertical light beam 615b, while the drone 606 also creates the vertical light beam 616b.

Note that for creating the letters of FIG. 6, the drones 601-607 represent nodes in the letters "H" and "E", whereas the light beams 611-617 represent the line segments of the letters. Relative positions of the drones 601-607 need to be coordinated accurately so as to create the image wherein line segments connect the nodes so as to form the letters as shown in FIG. 6. The same configuration of drones as shown in FIG. 6 may be used to create an image having other letters or numbers, for example the letters "P", "H", "I", "L", "I", "P", "S" or the numbers "0", "1", "2", . . . and "9".

Figure 7:
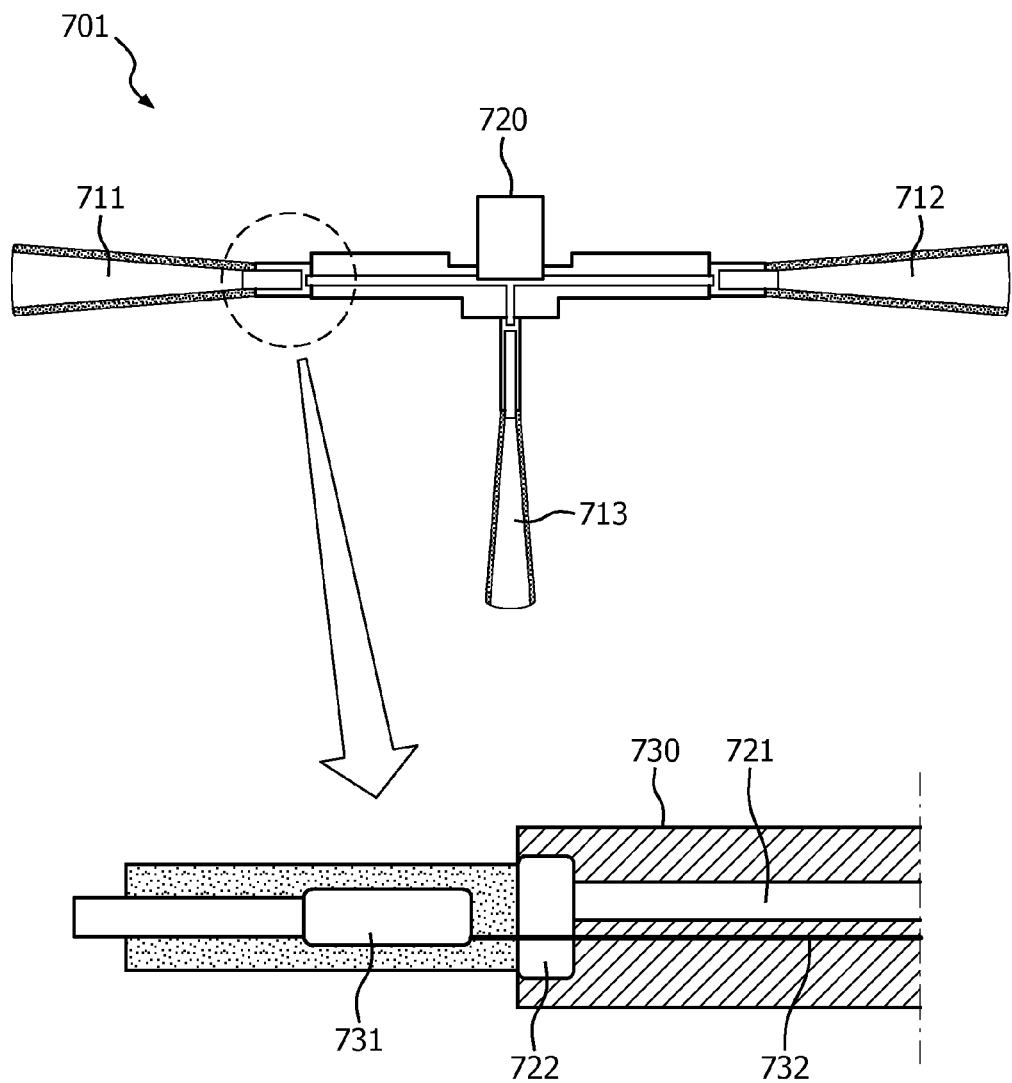
FIG. 7 illustrates a light source connection to a frame of the drone.

FIG. 7 illustrates a light 731 source connection to a frame 730 of the drone 701. By connecting the light source 731 to the frame 730, the drone effectively acts as a heat sink. The frame 730 is cooled by the air flow generated by rotors of the drone and excessive heat generated by the light source 730 is thus removed. This reduces the need for an additional heat sink, and therefore reduces both cost and weight of the drone 701.

FIG. 7 further illustrates the frame 730 having in its interior a power cable 732, and also a smoke canal 721. The power cable 732 is for feeding power from a power supply at the center of the drone 701 to the light source 731. The smoke canal 721 is for distributing smoke from the smoke generator 720 at the center of the drone 701 to a valve 722 near the light source 731. A processor in the drone 701 is connected to the smoke generator 720 and the valve 722, and is capable of opening and closing the valve 722 and activating the smoke generator 720. The drone releases smoke from the valve 722 by activating the smoke generator 720 and opening the valve 722. As a result the light from the light source will hit the smoke resulting in light beams 711-713.

Figure 8:
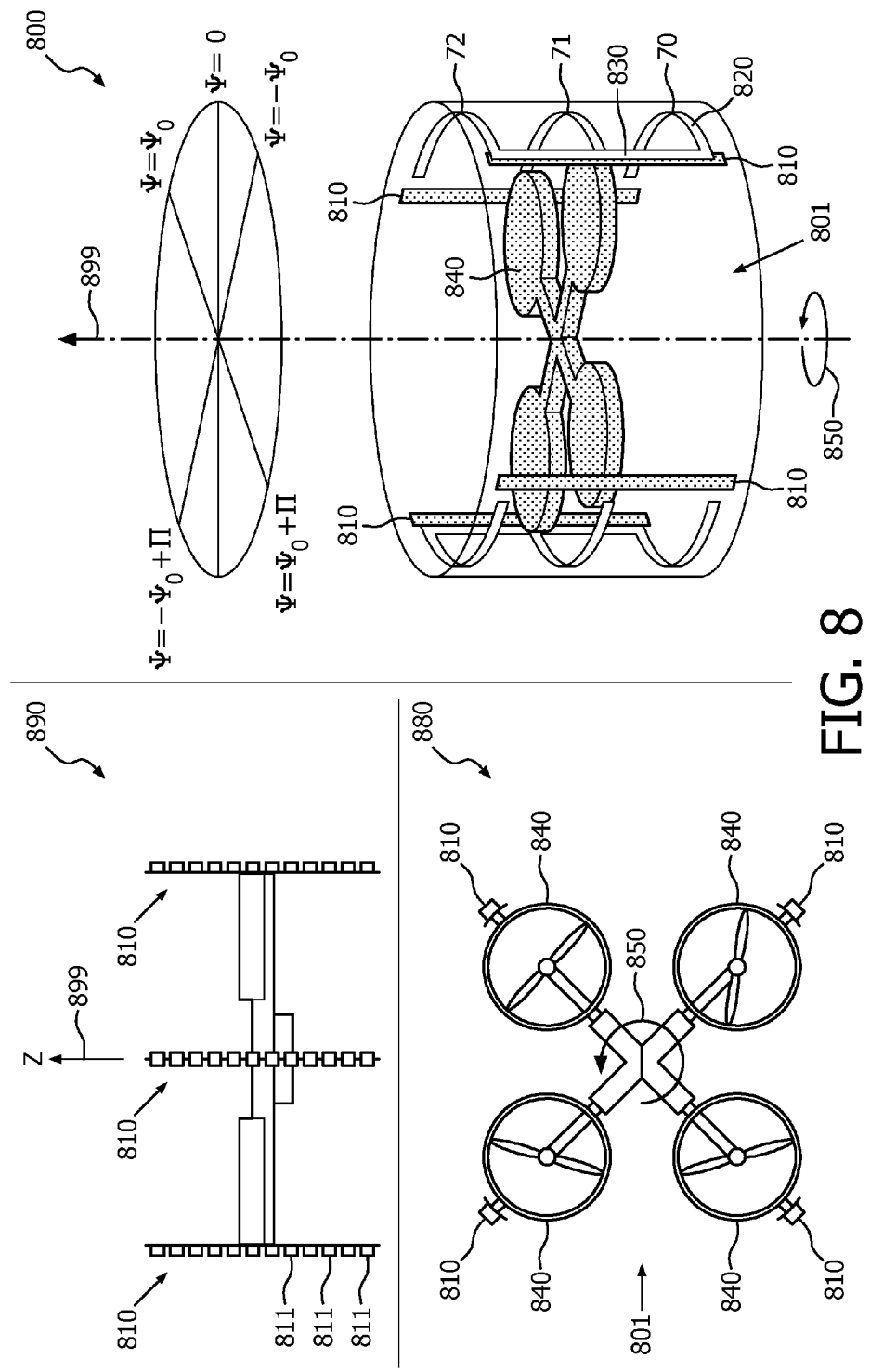
FIG. 8 illustrates an example of a drone for creating an image.

FIG. 8 illustrates an example of a drone 801 for creating an image. Subgraphs 890, 880 and 800 show a side view, a top view and a bird's eye view of the drone 801, respectively. The drone comprises 4 rotors rotating within the respective rotor areas 840. The drone 801 comprises four vertical LED strips 810 mounted at azimuths $\psi=0$, 90, 180 and 270 degrees, respectively. Each LED strip 810 comprises a vertical column of consecutively mounted LEDs 811. A processor of the drone 801 is connected to the LED stripes 810 and may control each LED 811 individually. The processor may also control the position and orientation of the drone 801. When in flight, the drone may change its orientation around a vertical axis 899 and thus create a rotation 850 around that vertical axis 899. The drone 801 may thus exhibit a continuous rotation 850, so that the LED stripes 810 are being rotated continuously around the vertical axis 899.

The image may be created by switching LEDs 811 on and off during the rotation 850. For example, the LED strips 810 may create horizontal and vertical lines during rotation. Subgraph 800 shows three LEDs of a LED strip 810 at three different vertical positions z1, z2 and z3, emitting light when the three LEDs are between azimuths $\psi=\pm\psi_0$. As a consequence, each of the three LEDs creates a horizontal line segment of light, as illustrated in subgraph 800. The three horizontal line segments thus appear at vertical positions z1, z2 and z3. In addition, a vertical line segment are created by briefly emitting light by all LEDs of a LED strip when that LED strip is at $\psi=-\psi_0$. A combination of the three horizontal line segments and the vertical line segment creates a letter "E". The drone 801 itself is thus arranged for creating various line segments on its own. Subgraph 800 further shows that, in similar way, another three horizontal line segments are created between azimuths $\psi=\pm\psi_0+\pi$ and another vertical line segment is created at $\psi=-\psi_0+\pi$.

By rotating the LED strips 810, the drone 801 in FIG. 8 effectively creates a cage around itself, i.e. a light ball/cylinder. The rotating LED strips 810 thus effectively provide a circular (or cylindrical) surface that surrounds the drone 801. Consequently the rotating LED strips 810 offer some additional protection to a part of the drone 801 inside that surface.

The drone 801 of FIG. 8 may effectively provide an image itself. The image created by the rotating LEDs 810 of drone 801 may not be limited to a few line segments of a single color as illustrated in FIG. 8. Each individual LED 811 may be individually controlled so as to change its color and intensity over time. For example, the LED 811 may be an RGB-LED, capable of emitting light of varying colors. Similar to the single-color vertical line segments (at azimuths $\psi=-\psi_0$ and $\psi=-\psi_0+\pi$) in FIG. 8, a multi-color vertical line segment may be created, composed of vertical pixels having different respective colors and intensities. By creating different multi-color vertical line segments at consecutive azimuths, a pixelated image may be created. The full 360-degree ($2\pi$) azimuth range may be segmented into azimuth segments (or 'intervals'), each azimuth segment being 6 degrees wide, for example. In addition, each LED strip 810 may have 12 pixels (as shown in FIG. 8), for example. The 360-degree pixelated image then has a resolution of 120×12 pixels.

As a variant of the previous example, the drone 801 creates two pixelated images, each of the two pixelated images using 180 degrees ($\pi$) of the full 360-degree ($2\pi$) azimuth range. The two pixelated images may each show the same content or different content. A first of the two pixelated images may be viewed by an audience on one side of the drone, whereas a second one of the two pixelated images may be viewed by an audience on the other side of the drone. As in FIG. 8, the two pixelated images may also use less than the full 180 degrees. For example, the first pixelated image may be created in the azimuth range $-\psi_0<\psi<\psi_0$, whereas the second pixelated image may be created in an azimuth range $-\psi_0+\pi<\psi<\psi_0+\pi$. In similar manner, other variants of this example may include creating more than two images (e.g. three, four or six) within the full 360-degree azimuth range.

A combination of multiple drones according to drone 801 in the previous examples may collectively create an image. For example, each drone 801 of the multiple drones 801 may represent an individual letter, whereas the combination may form a word composed of the individual letters and/or numbers. As another example, the combination of the multiple drones may form a multi-tile image, wherein each tile of the multi-tile image is an image in itself and each tile is being represented by a respective single drone 801. The multi-tile image may be configured as a row of drones 801, thus by lining the multiple drones 801 up horizontally. For example, 10 drones may fly horizontally adjacent to one another, thus creating a 'wide screen image' of 10 tiles wide. In an analogous way, the multi-tile image may be configured as a column of drones 801, thus by lining the multiple drones 801 lining up vertically. For example, 5 drones may fly vertically above one another, thus creating a narrow and vertically tall image being 5 high. In addition, the multi-tile image may be configured as a two-dimensional arrangement of tiles having both several rows and several columns. For example, the two-dimensional arrangement may comprise 50 drones flying in a two-dimensional arrangement, thus being 10 columns of drones 801 wide and 5 rows of drones 801 high.

The drone 801 may also be a single-axis helicopter. Note that a single-axis helicopter typically has (a) a main rotor at the single axis and (b) an additional rotor which may be a tail rotor or another, counter-rotating rotor at the same single axis. The additional rotor is for generating a counter rotational force to compensate a rotational force generated by the main rotor, so as to keep the helicopter from rotating around its vertical axis. As a single-axis helicopter thus already generates a rotational force, the rotation 850 (as in FIG. 8) may be caused by generating less counter rotational force than what is needed to keep the helicopter from rotating. As a result, single-axis helicopter would exhibit the necessary rotation 850 to act as the drone 801 in the examples of FIG. 8. As in FIG. 8, it would also require that the LED stripes 810 are mounted vertically at a distance from the center of the single-axis helicopter.

Several examples are described above in which an image is created using one or more drones. It should be noted that the image may be static but also dynamic. A static image corresponds to the drones creating an image that does not change within a time span (e.g. 10 seconds) so that the image appears as static to a viewer. A dynamic image corresponds to an image that changes frequently (e.g. every second), so that a viewer perceives the images as continuously changing. When the dynamic image changes with a very high frequency (e.g. in intervals smaller than a second), a viewer would perceive the dynamic image as a video. For example, the dynamic image may be a word that changes every second, and thus transmits a message of several words that form a sentence. As another example, drones 801 arranged in the two-dimensional arrangement mentioned above may for a video wall, creating a continuously changing image, e.g. a video of 4 frames per second.

Another way of creating an image by one or more drones is by 'drawing' line segments in the space, which will be described in what follows. Such an image is created by the drone(s) flying along a path that comprises the line segments, while emitting light when the drone(s) is at one of the line segments. For example, a letter "O" may be created by a drone traversing a circular or elliptical path in the space while emitting light, thus "writing" the letter "O". Multiple drones may also be used to write the same letter "O", each drone flying along the same path. For example, the letter "O" may be written by four drones, wherein each drone is a quarter of a circle away from two other drones that precede and succeed the drone in the circular path, respectively. By having a larger number of drones writing the same letter (or shape), a higher spatial density of drones is obtained, thus increasing the legibility of the letter.

For practical purposes, a shape composed of lines may be approximated in a piece-wise linear manner. A curve line thus may be approximated by multiple straight line segments. The image then may be created by drawing each of the straight line segments. The drone thus flies along a path having the straight line segments while emitting light. For example a circle is defined by a set of points, all at the same distance from a center point. The circle may be approximated by multiple straight lines. With the increasing number of straight lines (so that the length of each of the straight lines decreases) the shape will look more and more like a circle. The piece-wise approximation of the circle thus becomes more accurate. Creating an image having straight line segments may be more practical, as it may be easier to implement flying a drone along a straight line, thus from one end of a line segment to the other end of the line segment.

FIG. 9 illustrates piece-wise approximation of a shape being a circle. As the number of (straight) line segments to approximate the circle increases, the multiple line segments achieve a more accurate approximation of the circle. The number of line segments to compose the circle increases from left 901 to right 902 in FIG. 9. In a similar way, any curved line may be approximated in such a piece-wise linear manner. An image showing a shape having curved lines may therefore be created by (1) approximating the shape in a piece-wise linear manner and (2) drone(s) flying along the approximating straight line segments while emitting light. An existing shape having curved line segments may thus be converted to its piece-wise approximated version or, alternatively, a shape may be designed from scratch in terms of straight line segments.

The said piece-wise approximation of said shape or said design from scratch may be done using a dedicated software program on a computer. Such a software program may use a grid of points (GOP) to as an aid in the design or approximation. A line segment may then be confined to having its start vertex and end vertex at one of the GOP. An algorithm may be used to automatically convert curved line segments to multiple straight line segments. Alternatively, the grid may be used in an overlay on a shape having curved lines, while a user (using a user interface) may place straight line segments in the overlay in order to approximate the shape.

FIGS. 10a and 10b illustrate the grid of points. FIG. 10a illustrates a GOP 1001 without a shape. FIG. 10b illustrates a GOP 1002 and a pentagon-like shape 1003 having five nodes (i.e. vertices) and five line segments. Each of the five vertices is at a grid point 1004. Note that the spatial resolution of the shape is potentially higher as the spatial density of the grid points increases. A drone capable of receiving a position and, in response, flying from its current position to the received position, requires receiving the positions of the five vertices. Having received the five positions and appropriate timing data (e.g. time of arrival at each vertex and flying speed), the drone may then fly along the five line segments by successively traversing the five vertices.

In order to represent a shape having line segments, a drone needs to fly along a path that includes the line segments. The path thus spatially links the line segments. The path needs to be determined based on said shape and is to meet certain requirements. By linking the line segments of the shape by means of linking segments, a (continuous) path may be determined. The drone may thus represent the shape by flying along the path and (a) switching on (or increasing) it's emitted light when being at a line segment and (b) switching off (or reducing) it's emitted light when being at a linking segment.

When using multiple drones for creating an image, each of the multiple drones is to fly its path without colliding with another drone. Determining paths for the respective multiple drones thus implies coordinating the paths and the corresponding timing such that collisions are prevented. Note that, a path and its corresponding timing determine at what position the drone is at a predefined moment in time. Therefore, said paths may be determined by (a) limiting mutual proximities of different paths (or different parts of the same path) or corresponding to different drones and (b) coordinating timing such that no two drones are near the same position in the space at the same moment in time.

Multiple drones may have different paths or may have the same path. Having the same path, each drone flies along same positions but at different moments in time, thus representing the same part of the shape. Having different paths, two drones of the multiple drones may fly along different positions, thus representing respective different parts of the shape. FIGS. 11a and 11b each illustrate two flight paths 1101 and 1107 of two respective drones 1110 and 1111 for 'writing' (representing) the letter "O". FIG. 11a illustrates a first drone 1110 having a path 1102, 1103 covering a left half of the "O", whereas a second drone 1111 has a path 1104, 1105 covering a right half of the "O". The first drone 1110 writes said left half by flying up 1102 and down 1103 along said left half, whereas the second drone 1111 writes said right half by flying up 1104 and down 1105 along right half. FIG. 11b illustrates the first drone 1110 and the second drone 1111 having the same path 1112, 1114, being the entire letter "O", and are at different positions (opposite sides in this case) of the "O" at the same moment in time.

In a particular example, the created image corresponds to written text and determined paths correspond to a writing pattern of a person. For example, consider a path corresponding to a letter "O" written in a counterclockwise manner, which corresponds the direction most people would write a letter "O", e.g. when using a pen. Consequently, an observer would perceive the image created by the drone(s) as if text is being written in the space.

The path may be a closed path, so that a drone ends up at the same position after flying along the entire closed path. In other words, the closed path forms a loop. A shape being a letter "O" is already a closed path by itself. Other shapes, such as the capital letter "E" is not a closed path by itself, so that a closed path is formed by (a) line segments of the letter "E" and (b) linking segments that link said line segments into a closed path.

The closed path may be determined by using graph theory, in particular by determining a so-called Eulerian Cycle. Background on Eulerian paths is provided by Wikipedia as retrieved on Aug. 1, 2014: http://en.wikipedia.org/wiki/Eulerian_path. An additional literature reference on the Eulerian cycle is: Bollobás, B. Graph Theory: An Introductory Course. New York: Springer-Verlag, p. 12, 1979. A Eulerian cycle is a path that traverses all edges of a graph once, starting and ending at the same vertex. In the current context, the graph corresponds to the shape, edges of the graph correspond to line segments of the shape, nodes of the graph correspond to start- and end vertices of the respective line segments, and the Eulerian cycle corresponds to the closed path.

A Eulerian cycle may be determined if the graph meets a requirement that each vertex in the graph has an even number of edges. A shape composed of line segments may be transformed into a graph that meets said requirement by adding additional linking segment. A linking segment is a line segment that connects original line segments of the shape. FIGS. 12a and 12b illustrate a letter "E" being transformed into a graph wherein each vertex 1201 has an even number of line segments 1202. The letter "E" is composed of six vertices 1201 (solid lines), wherein four of the six vertices 1201 are connected to an odd number of line segments 1202. By adding linking segments 1203, 1204 (FIG. 12b, dotted lines) the four vertices 1202 are connected by the linking segments, so that an Eulerian Cycle is created. The closed path is thus formed by (a) five original line segments 1202 of the letter "E" and (b) the linking segments 1203. 1204. A criterion for determining the closed path may be to keep the total length of the closed path limited, such that the linking segments add a minimal amount of path length to the line segments.

A drone may thus 'write' a letter (e.g. the letter "E" in FIGS. 12a,b) by flying along the closed path, by increasing its visibility when being at a line segment of the letter and by reducing its visibility when being at a linking segment. For example, consider a drone having a light source and a smoke generator. The drone may switch on its light source (or at least increase the intensity of emitted light from the light source) when being at a line segment, and may switch off its light source (or at least decrease the intensity of emitted light from the light source) when being at a linking segment. In addition, the drone may also switch off its smoke generator (or reduce its output) when being at a linking segment.

Linking segments may intersect in an unfortunate manner to line segments, causing an increase of a risk of collision between drones that fly along the same closed path. For example, consider the closed path in FIG. 12b. A drone flying down the left side of the letter "E" may collide near vertex 1206 with another drone that flies up the linking segment 1204 from vertex 1207 and approaches vertex 1206. Reducing said risk of collisions may be achieved by having the linking segments (at least partly) being in an additional layer (or space) adjacent to the plane (or space) comprising line segments. The additional layer is out of the plane (or shape) comprising the line segments.

Figure 13A:
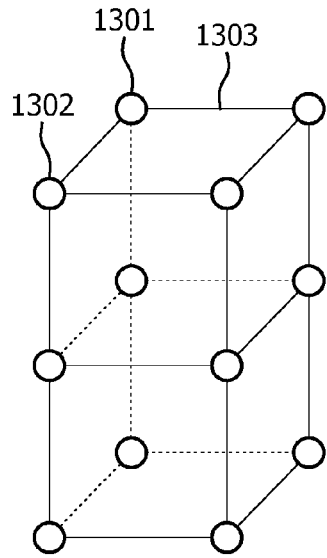
FIGS. 13a and 13b illustrate a three-dimensional wire frame having a front layer of vertices and an additional layer of vertices.
Figure 13B:
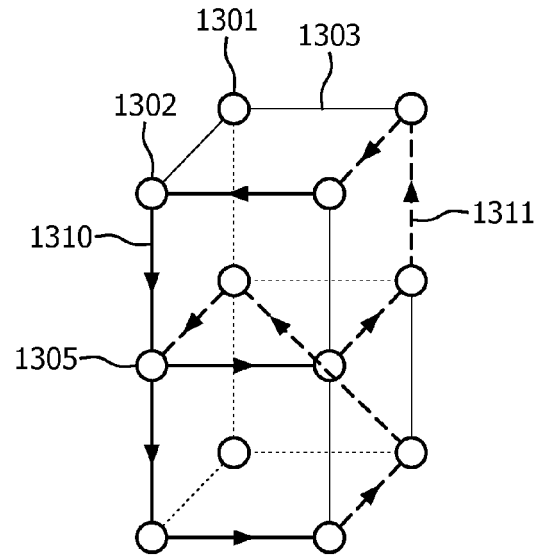

FIGS. 13a and 13b illustrate a three-dimensional (3D) wire frame having a front layer of (six) vertices 1302 and an additional rear layer of (six) vertices 1301. The additional rear layer is parallel to the front layer. FIG. 13a illustrates the vertices 1301, 1302 and potential connections 1303 (line segments or linking segments) between them. FIG. 13b shows line segments 1310 (solid lines) forming a letter "E" and linking segments 1311 (dashed lines) connecting the line segments 1310. Compared to FIG. 12b, the linking segments 1311 have moved out of the front layer into the back layer. The risk of collisions has thus decreased at the cost of an increased length of the closed path (as compared to FIG. 12b). By having the back layer being parallel to the front layer, the increased length is being limited, because the linking segments only take a slight detour to connect the line segments via the back layer. Note that in FIG. 13b, arrows on the line segments and linking segments indicate a direction of flying along the closed path.

Figure 14A:
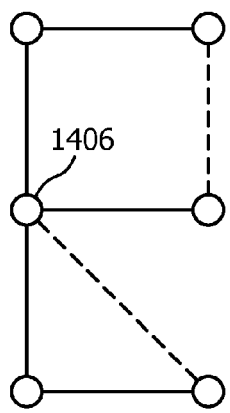
FIGS. 14a-c illustrate splitting of the vertices.
Figure 14B:
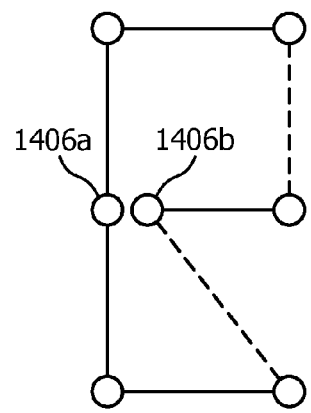
Figure 14C:
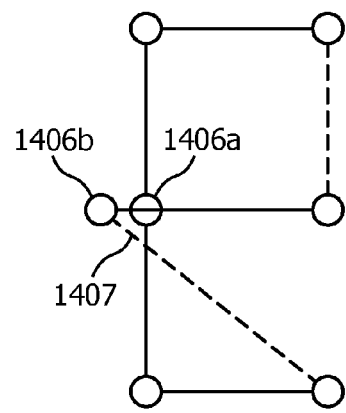

The closed path of FIG. 13b still has a vertex 1305 that presents a risk for collisions when multiple drones fly along the closed path. Vertex 1305 is a position where the closed path passes through twice. As mentioned before, this is also the case for vertex 1206 in FIG. 12b. FIGS. 14a-c illustrate a way to resolve the risk of collisions by splitting a vertex. FIG. 14a repeats the illustration of FIG. 12b, wherein a vertex 1406 is a copy of vertex 1206. The closed path of FIG. 14a passes through the vertex 1406 twice, causing a risk for collisions. FIG. 14b illustrates the vertex 1406 being split into vertex 1406a and vertex 1406b. Consequently, the closed path of FIG. 14b now passes only once through vertex 1406a and only once through vertex 1406b. A sufficient spatial separation between the vertices 1406a and 1406b reduces the risk of collisions. However, the spatial separation should be sufficiently small to preserve legibility of the created image showing the letter "E".

FIG. 14c illustrates splitting of the vertex 1406 into vertex 1406a and vertex 1406c. The vertices 1406a and 1406c are spatially separated, but the closed path nevertheless passes through vertex 1406a twice. The closed path of 14c even creates an additional intersection 1407. Therefore, by verifying whether the closed path does not intersect the closed path at other positions, the closed path of FIG. 14c may be avoided. A way of determining a closed path that does not create such undesired intersections may be randomly generating multiple vertices at a predefined spatial separation to the node 1406a, and by selecting a vertex 1406b from the multiple vertices that corresponds to a closed path not having said undesired intersections. An additional criterion for selecting the vertex 1406b may be to have a limited (total) length of the closed path.

Figure 15A:
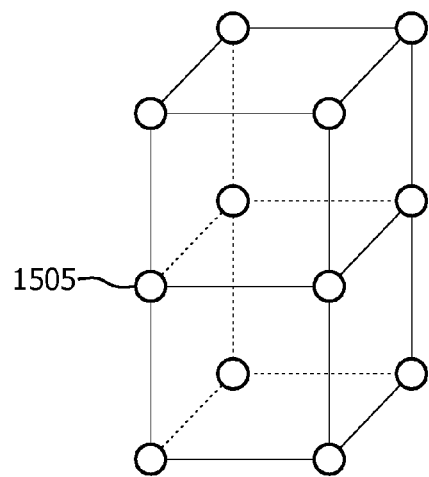
FIGS. 15a and 15b illustrates splitting of a vertex for the closed path of FIG. 13b.
Figure 15B:
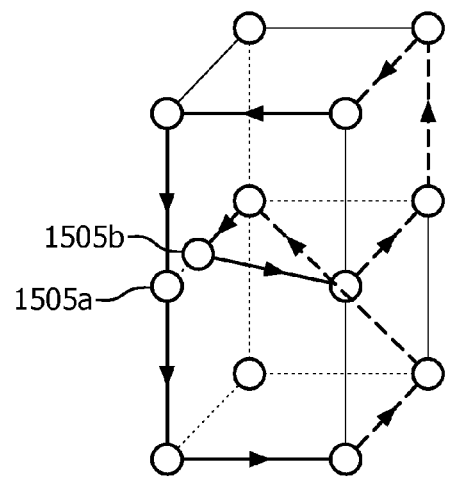

FIGS. 15a and 15b illustrates splitting of a vertex for the closed path of FIG. 13b. The procedure for splitting the vertex in is analogous as described in the previous paragraph. FIG. 15b thus shows a modification of the closed path of FIG. 13b. The vertex 1505 is split into vertices 1505a and 1505b, so that the closed path passes through vertices 1505a and 1505b only once.

Having a shape comprising line segments and a closed path that includes the line segments, drones may fly along the closed path, emit visible light via their respective light sources when being at the line segments and reduce visibility of the emitted light (or switch it off) when being at the linking segments. The image having the shape is thus created. The system (e.g. via the control unit 101 VCTRL) may determine: a total length of the closed path, a total number of drones for successively flying along the closed path and the resulting spatial separation of the drones while flying along the closed path. A high number of drones simultaneously flying along the closed path are beneficial for representing the shape with a high spatial resolution of emitted lights. A low number of drones simultaneously flying along the closed path are beneficial for having a low risk of collisions between the drones. The control unit 101 VCTRL may determine the total amount of drones such that each of the multiple drones is separated from other drones of the multiple drones by at least a predetermined minimum spatial separation at all times.

Although embodiments above describe a two-dimensional (2D) shape having line segments (i.e. in a vertical plane in the volume of interest VOI), creating an image having a shape is not limited to two dimensions only. The shape may be three-dimensional, thus having line segments in a 3D volume rather than a 2D plane. For example, the shape may comprise a 3D wireframe having nodes and connecting line segments between the nodes. Determining a closed path for a 3D shape is essentially the same as for a 2D shape, as described above.

The processor of the control unit 101 VCTRL may be any processor suitable for performing operations for controlling the system SYS as described above. Likewise, the processor of the drone may be any processor for performing operations for controlling the drone as described above. An example of such a processor is a general purpose processor, an ASIC or an FPGA.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A flying device for presenting an image in a space, the flying device arranged to fly in the space, the flying device comprising:
   one or more light units arranged to emit multiple light beams in respective directions relative to the flying device,
   a communication unit arranged to receive a control signal, and
   a processing unit arranged to control, based on one or more received control signals:
      a position of the flying device and
      a light output of each of the multiple light beams
   wherein
   the respective directions are along axes of an orthogonal reference system, fixed relative to the flying device; and
   the light beams are collimated bundles of light for representing line segments of the image presented in the space.

2. The flying device according to claim 1, wherein at least one of the respective directions is oriented parallel to gravity when the flying device is in operation.

3. The flying device according to claim 1, further comprising a particle generator for generating particles for reflecting light.

4. Flying device according to claim 3, wherein the particle generator is at least one of:
   a smoke generator and
   a generator of fine water droplets.

5. The flying device according to claim 1, wherein controlling the light output comprises controlling lighting properties of at least one of the multiple light beams, the lighting properties comprising at least one of light intensity and light color.

6. The flying device according to claim 1, wherein controlling the light output comprises controlling switching the light beam on and switching the light beam off.

7. The flying device according to claim 1, wherein the communication unit is arranged to receive the control signal wirelessly.

8. The flying device according to claim 1, wherein the one or more light units (731) are arranged to emit at least one of a laser beam and a visible light beam.

9. A system for presenting an image in a space, the system comprising multiple flying devices according to claim 1.

10. The system according to claim 9, comprising:
    a control unit arranged to:
       determine the image to be presented in the space, the image having line segments, each line segment of the line segments corresponding to a position and an orientation in the space,
       associate to the each line segment a flying device of the multiple flying devices for representing the respective line segments in the space, and wherein at least one of the multiple flying devices is arranged to represent at least two of the line segments, and
       determine for the each flying device a control signal for controlling a position and a light output of the each flying device such that the each line segment is being presented in the space by a light beam of the associated flying device, and
    a communication unit for sending the respective command signal to the flying devices.

11. The system according to claim 9, wherein the system is arranged to represent the image having a shape, the shape comprising a first line segment connected to a second line segment, the first line segment coinciding in the space with the second line segment, the first line segment represented by a first flying device and the second line segment represented by a second flying device.

12. The system according to claim 11, wherein the first line segment is obtained by the first flying device directing a light beam towards the second flying device.

13. The system according to claim 9, wherein the system is arranged to present an image having line segments comprising line segments forming at least one of a character, a number and a letter of an alphabet.

14. A method of presenting an image in a space using a flying device according to claim 1, the method comprising:
    receiving a control signal in the flying device, and
    controlling, based on one or more received control signals:
       a position of the flying device; and
       a light output of each of the multiple light beams emitted by the flying device
    wherein
       the respective directions are along the axes of an orthogonal reference system, fixed relative to the flying device; and
    the light beams are collimated bundles of light for representing line segments of the image presented in the space.

* * * * *